United States Patent
Hao et al.

(10) Patent No.: US 11,924,371 B2
(45) Date of Patent: Mar. 5, 2024

(54) CONTENT SENDING METHOD AND APPARATUS, AND CONTENT RECEIVING METHOD AND APPARATUS

(71) Applicant: HUAWEI TECHNOLOGIES CO., LTD., Shenzhen (CN)

(72) Inventors: Hongxia Hao, Shenzhen (CN); Zhilei Deng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/341,609

(22) Filed: Jun. 8, 2021

(65) Prior Publication Data
US 2021/0297462 A1    Sep. 23, 2021

Related U.S. Application Data

(63) Continuation of application No. PCT/CN2020/072492, filed on Jan. 16, 2020.

(30) Foreign Application Priority Data

Jan. 30, 2019 (CN) .......................... 201910093702.1

(51) Int. Cl.
*H04M 3/42* (2006.01)
*H04L 65/1069* (2022.01)
(Continued)

(52) U.S. Cl.
CPC .... *H04M 3/42017* (2013.01); *H04L 65/1069* (2013.01); *H04N 7/14* (2013.01); *H04L 47/722* (2013.01); *H04L 65/1101* (2022.05)

(58) Field of Classification Search
None
See application file for complete search history.

(56) References Cited

U.S. PATENT DOCUMENTS

| 7,274,662 B1 * | 9/2007 | Kalmanek, Jr. ....... H04L 47/785 370/395.5 |
| 7,903,803 B2 * | 3/2011 | Raju ................. H04M 3/42017 379/202.01 |

(Continued)

FOREIGN PATENT DOCUMENTS

| CN | 101431650 A | 5/2009 |
| CN | 101540963 A | 9/2009 |

(Continued)

OTHER PUBLICATIONS

Handley et al. "SDP: Session Description on Protocol." Network Working Group, Request for Comments: 4566. Jul. 2006. 50 pages.
(Continued)

*Primary Examiner* — Quoc D Tran
(74) *Attorney, Agent, or Firm* — Maier & Maier, PLLC

(57) ABSTRACT

A content sending method includes: a server obtains video media content and additional information content, indicates a calling terminal to complete resource reservation for transmitting the video media content and the additional information content, transmits the video media content to a first port set of the calling terminal, and transmits the additional information content to a second port set of the calling terminal. In this way, two types of content streams are transmitted to the calling terminal by using channels of the two port sets, and a function of providing an additional service in a process of playing a video ring back tone is implemented.

15 Claims, 7 Drawing Sheets

(51) Int. Cl.
*H04N 7/14* (2006.01)
*H04L 47/722* (2022.01)
*H04L 65/1101* (2022.01)

(56) References Cited

U.S. PATENT DOCUMENTS

| | | | |
|---|---|---|---|
| 2007/0030338 A1* | 2/2007 | Jiang | H04N 7/147 348/E7.079 |
| 2007/0286372 A1* | 12/2007 | DeMent | H04M 15/06 379/142.01 |
| 2010/0098232 A1* | 4/2010 | Wu | H04M 7/129 379/207.16 |
| 2021/0044643 A1* | 2/2021 | Bouvet | H04L 65/80 |

FOREIGN PATENT DOCUMENTS

| | | | |
|---|---|---|---|
| CN | 101795330 A | 8/2010 | |
| CN | 104683602 A | 6/2015 | |
| CN | 106303104 A | 1/2017 | |
| CN | 107580150 A | 1/2018 | |
| CN | 109104618 A | 12/2018 | |
| EP | 2131613 A1 | 12/2009 | |
| EP | 3806416 A1 | 4/2021 | |
| KR | 20070053086 A | 5/2007 | |
| WO | 2012129874 A1 | 10/2012 | |

OTHER PUBLICATIONS

3GPP. "3rd Generation Partnership Project; Technical Specification Group Core Network and Terminals; IP Multimedia Subsystem (IMS) Customized Alerting Tones (CAT); Protocol specification (Release 15)." 3GPP TS 24.182 V15.0.0 (Mar. 2018). 156 pages.

* cited by examiner

CONTENT SENDING METHOD AND APPARATUS, AND CONTENT RECEIVING METHOD AND APPARATUS

CROSS-REFERENCE TO RELATED APPLICATIONS

This application is a continuation of International Application No. PCT/CN2020/072492, filed on Jan. 16, 2020, which claims priority to Chinese Patent Application No. 201910093702.1, filed on Jan. 30, 2019. The disclosures of the aforementioned applications are hereby incorporated by reference in their entireties.

TECHNICAL FIELD

The embodiments relate to the field of communications with video ring back tone, and in particular, to a content sending method and apparatus, and a content receiving method and apparatus.

BACKGROUND

An audio ring back tone service is a conventional value-added service 0. After a user subscribes to the audio ring back tone service on a website of an operator and selects a ring back tone, all terminals that call the user can hear, in a ringing phase, the ring back tone selected by the user. A video ring back tone service implements a comprehensive upgrade of the conventional audio ring back tone service. An original ring back tone that is in form of audio and that is with monotonous experience is transformed into a ring back tone that is in form of a rich media that integrates both audio and videos.

A system for implementing a ring back tone in a rich media form usually includes a calling terminal, a called terminal, a ring back tone application server (RBT-AS), a ring back tone media resource server (RBT-MRS), and the like. After the calling terminal initiates a call request (for example, a SIP message), the RBT-AS requests a ring back tone media resource description or a video ring back tone resource description from the RBT-MRS to complete negotiation and reservation for ring back tone media resources with the calling terminal, and then the RBT-MRS forwards a video ring back tone content to the calling terminal via the RBT-AS. In this way, the calling terminal can play a video ring back tone.

However, current audio ring back tones or video ring back tones that are played on terminals can only be listened to or watched by users, and are not interactable for the users, which affects user experience.

SUMMARY

Embodiments provide a content sending method and apparatus, and a content receiving method and apparatus, to further provide an additional service in a process of playing a video ring back tone, thereby meeting a further requirement of user experience.

According to a first aspect, an embodiment provides a content sending method. The method is applied to a server. The method includes: the server obtains video media content and additional information content, and the server indicates a calling terminal to complete resource reservation for transmitting the video media content and the additional information content, transmits the video media content to a first port set of the calling terminal, and transmits the additional information content to a second port set of the calling terminal.

Optionally, the server is a server or a server cluster that has functions of an RBT-AS, an RBT-MRS, and an additional information server.

According to the method provided in this aspect, a function for storing and managing additional information content is added to a server end, proper additional information content is obtained by querying based on information about a calling party and a called party, and then the additional information content and the video media content are sent to two port sets of the calling terminal. In this way, two types of content streams are transmitted to the calling terminal by using channels of the two port sets, and a function of providing an additional service in a process of playing a video ring back tone is implemented, thereby meeting a further requirement on user experience.

With reference to the first aspect, in a possible implementation of the first aspect, that the server obtains additional information content includes: the server obtains at least one identifier, where the at least one identifier includes a calling party identifier, a called party identifier, or a video ring back tone media identifier; and the server determines, based on the at least one identifier and stored historical information, the additional information content.

With reference to the first aspect, in another possible implementation of the first aspect, that the server indicates a calling terminal to complete resource reservation for transmitting the video media content and the additional information content includes: the server sends a session description protocol (SDP) message to the calling terminal, where the SDP message includes a first SDP description about the video media content and a second SDP description about the additional information content that are negotiated with the calling terminal, information about the first port set is included in the first SDP description, and information about the second port set is included in the second SDP description; and the server receives a reservation acknowledgement notification sent by the calling terminal, where the reservation acknowledgement notification is used to indicate that the calling terminal completes the resource reservation for the video media content and the additional information content.

In this implementation, the server notifies, in advance by using the first SDP description and the second SDP description, the calling terminal of related information about the two types of content streams to be sent to the calling terminal, so that the calling terminal completes resource reservation for two types of content, thereby preparing for simultaneous reception of two types of data streams.

Optionally, the information about the first port set includes a first port number and a second port number, where a first port corresponding to the first port number and a second port corresponding to the second port number are used to receive the video media content, and the information about the second port set includes a third port number, where a third port corresponding to the third port number is used to receive the additional information content.

With reference to the first aspect, in still another possible implementation of the first aspect, the method further includes: the server receives information about an interaction operation from the calling terminal. The information about an interaction operation includes duration during which a calling terminal displays the additional information, or an interaction operation performed on the additional information. In this implementation, the server stores and records the information about an interaction operation after receiving the information about an interaction operation, so as to use the information about an interaction operation for subsequent processing and delivery of additional information content, and provide a reference basis for subsequently sending additional information content to the calling terminal again.

According to a second aspect, an embodiment provides a content receiving method. The method is applied to a calling terminal. The method includes: the calling terminal completes resource reservation for video media content and additional information content based on an indication of a server; and the calling terminal receives the video media content from the server by using a first port set, and receives the additional information content from the server by using a second port set.

With reference to the second aspect, in a possible implementation of the second aspect, the additional information content is generated by the server based on additional information. The additional information is determined by at least one identifier and stored historical information, and the at least one identifier includes a calling party identifier, a called party identifier, or a video ring back tone media identifier.

With reference to the second aspect, in another possible implementation of the second aspect, that the calling terminal completes resource reservation for video media content and additional information content based on an indication of a server includes: the calling terminal receives a session description protocol (SDP) message sent by the server, where the SDP message includes a first SDP description about the video media content and a second SDP description about the additional information content that are negotiated with the calling terminal, information about the first port set is included in the first SDP description, and information about the second port set is included in the second SDP description; and the calling terminal completes the resource reservation for the video media content and the additional information content based on the SDP message, generates a reservation acknowledgement notification, and sends the reservation acknowledgement notification to the server.

Optionally, the information about the first port set includes a first port number and a second port number, where a first port corresponding to the first port number and a second port corresponding to the second port number are used to receive the video media content, and the information about the second port set includes a third port number, where a third port corresponding to the third port number is used to receive the additional information content.

With reference to the second aspect, in still another possible implementation of the second aspect, the method further includes: the calling terminal plays a video corresponding to the video media content, and the calling terminal displays additional information corresponding to the additional information content.

Further, the calling terminal plays the video corresponding to the video media content and displays the additional information corresponding to the additional information content at the same time. In this implementation, when the server delivers two types of content streams to the calling terminal at the same time, the calling terminal may play the video and display the additional information at the same time, so that this method is applicable to a scenario where there are massive video ring back tone contents, each of which has relatively short duration, thereby video playing performance and flexibility is improved.

With reference to the second aspect, in still another possible implementation of the second aspect, the method further includes: the calling terminal obtains information about an interaction operation performed by a calling user on the additional information, where the information about an interaction operation includes duration during which the calling terminal displays the additional information, or an interaction operation performed on the additional information; and the calling terminal sends the information about the interaction operation to the server.

According to a third aspect, an embodiment provides a method for sending additional information content. The method is applied to an additional information server. The method includes: the additional information server obtains an additional request message sent by a media resource server (MRS), where the additional request message includes at least one of a calling party identifier, a called party identifier, or a video ring back tone media identifier; the additional information server determines, based on the at least one identifier and stored historical information, additional information content; and the additional information server sends the additional information content to the MRS.

It may be noted that the additional information server described in this aspect and the server described in the first aspect may be a same server or server cluster that is set up together, or may be different servers or server clusters that are set up separately. The RBT-AS and the RBT-MRS may be a same server or server cluster that is set up together or may be different servers or server clusters that are set up separately. This is not limited.

According to a fourth aspect, an embodiment provides a content sending apparatus. The apparatus includes units configured to perform the method steps in the first aspect and the implementations of the first aspect. For example, the apparatus includes a receiving unit, a processing unit, and a sending unit, and may further include other modules or units such as a storage module.

Optionally, the content sending apparatus is a server or a server cluster that has functions of an RBT-AS, an RBT-MRS, and an additional information server.

According to a fifth aspect, an embodiment further provides a content receiving apparatus. The apparatus includes units configured to perform the method steps in the second aspect and the implementations of the second aspect. For example, the apparatus includes a receiving unit, a processing unit, and a sending unit, and may further include other modules or units such as a storage module.

Optionally, the content receiving apparatus is a calling terminal or a functional module deployed on the calling terminal.

According to a sixth aspect, an embodiment provides an apparatus for sending additional information content. The apparatus may be an additional information server. The apparatus includes: an obtaining unit, configured to obtain an additional request message sent by a media resource server (MRS), where the additional request message includes at least one of a calling party identifier, a called party identifier, or a video ring back tone media identifier; a processing unit, configured to determine, based on the at least one identifier and stored historical information, the additional information content; and a sending unit, configured to send the additional information content to the MRS.

According to a seventh aspect, in terms of hardware implementation, an embodiment further provides a communications device, for example, a server or a terminal device. The communications device includes a transceiver, a processor, and a memory, the memory stores a program and an instruction, and the processor may execute the program or the instruction stored in the memory, so as to implement the content sending method in the first aspect and the implementations of the first aspect, or implement the content receiving method in the second aspect and the implementations of the second aspect.

In addition, when serving as an additional information server, the communications device is further configured to implement the method for sending additional information content according to the third aspect.

According to an eighth aspect, the embodiments further provide a computer storage medium. The computer storage medium may store an instruction, and when the instruction is executed on a computer, the methods according to the first aspect to the third aspect and the implementations of the first aspect to the third aspect are implemented.

According to a ninth aspect, the embodiments further provide a computer program product. When the computer program product is executed on a computer, the methods according to the first aspect to the third aspect and the implementations of the first aspect to the third aspect are implemented.

According to the content sending method and apparatus, and the content receiving method and apparatus provided in the embodiments, an additional information server is added in addition to an original ring back tone media system to store and manage additional information content, and provide proper additional information content for a calling terminal based on a request of the RBT-MRS. In this way, the server provides both a video ring back tone service and an additional information service for the calling terminal, thereby a further requirement on user experience is met.

In addition, the additional information server that provides additional information content searches for proper additional information content for the calling user and the called user based on the ring back tone media identifier, or the calling party identifier, or the called party identifier in the request message, which is a process of dynamic allocation. For example, different additional information content may be dynamically determined for different ring back tone media content, different calling party identifier or called party identifier, so that flexibility of providing an additional information service is further improved, thereby quality of service is improved.

DETAILED DESCRIPTION OF THE EMBODIMENTS

To make objectives, features, and advantages of the embodiments clearer, the following further describes the solutions in the embodiments in detail with reference to the accompanying drawings.

Figure 1:
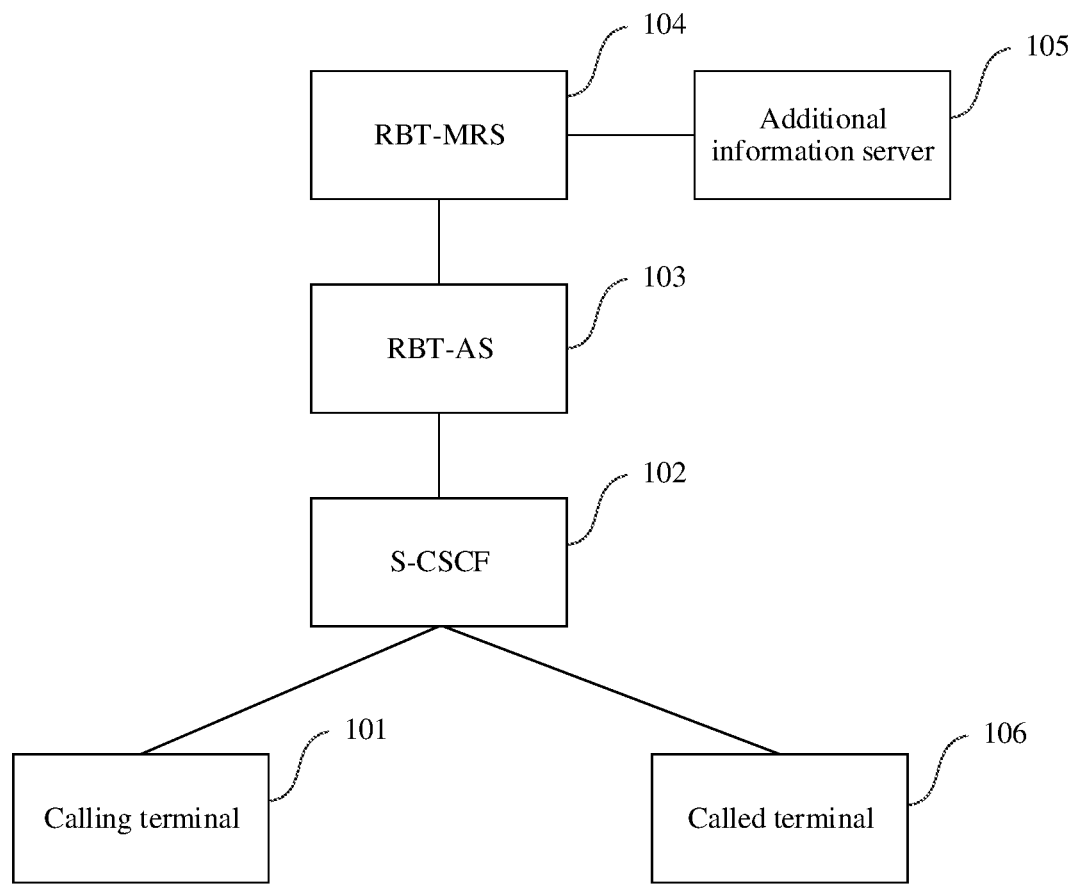
FIG. 1 is a schematic structural diagram of a multimedia play system according to an embodiment.

Before the solutions in the embodiments are described, an application scenario of the embodiments is first described with reference to the accompanying drawings. FIG. 1 is a schematic structural diagram of a multimedia play system to which an embodiment is applicable. The system may include: a calling terminal 101, a serving call session control function (S-CSCF) 102, a ring back tone application server (RBT-AS) 103, a ring back tone media resource server (RBT-MRS) 104, and a called terminal 106. In addition, the system further includes an additional information server 105.

For example, the calling terminal 101 and the called terminal 106 are user equipment (UE) that has a session-related function and that may perform a calling operation and a called operation, for example, a device such as a mobile phone, a tablet computer, a wearable device, or a portable computer. In one call, the calling terminal 101 performs a calling operation, and the called terminal 106 performs a called operation. The calling terminal 101 and the called terminal 106 are respectively in communication connection with the RBT-AS 103 through the S-CSCF 102.

Optionally, the S-CSCF 102 may be a network element located in a home IP multimedia subsystem (IMS) network, and performs session control for user equipment and processes a registration request from the user equipment. When the user equipment is in a session, the S-CSCF 102 processes a session state in the network. The calling terminal 101 and the called terminal 106 perform communication through the RBT-AS 103 and the S-CSCF 102.

The RBT-AS 103 is a server, configured to process message interaction and media resource negotiation in a ring back tone signaling interaction process. Further, the RBT-AS 103 may be configured to be responsible for ring back tone-related signaling processing, providing the calling terminal 101 and the called terminal 106 with a SIP message, a parsing and forwarding message, and a session description protocol (SDP) message, negotiating media resource reservation with the calling terminal 101, and other functions.

The RBT-MRS 104 is a server, configured to store and manage media content, for example, store content for an audio ring back tone media stream and content for a video ring back tone media stream of a ring back tone. In addition, the RBT-MRS 104 may also be configured to distribute and manage ring back tone media content. For example, after the RBT-AS 103 completes ring back tone resource negotiation with the calling terminal 101, the RBT-MRS 104 may transmit corresponding media content to the calling terminal 101.

The additional information server 105 is configured to manage an additional information content of a video ring back tone content, provide an interface for querying the additional information content, and interconnect with other external systems for, for example, querying attributes of a user or a ring back tone from the other external systems.

The additional information content includes one or more of content, a resource, a feature of the resource, a resource address, a presentation manner of the resource, and the like. Further, the resource may be a movie promo, an advertisement, a resource for entertainments, or the like, and a form and content of a specific resource are not limited in this embodiment.

It may be noted that the description about the system architecture in FIG. 1 includes, but is not limited to, a specific manner of setting up a server. The RBT-MRS 104 and the additional information server 105 may be a same server or server cluster that is set up together, or may be different servers or server clusters that are set up separately. Similarly, the RBT-AS 103 and the RBT-MRS 104 may be a same server or server cluster that is set up together, or may be different servers or server clusters that are set up separately, or the RBT-AS 103, the RBT-MRS 104, and the additional information server 105 may be integrated into a server, to provide a service for the calling terminal and the called terminal. This is not limited in this embodiment.

Figure 2:
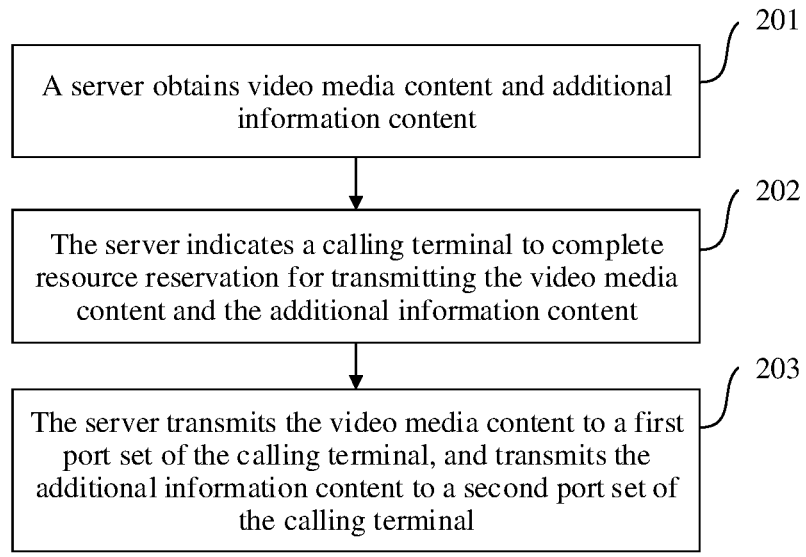
FIG. 2 is a flowchart of a content sending method according to an embodiment.

FIG. 2 is a flowchart of a content sending method according to an embodiment. The method may be applied to a server side in the network architecture shown in FIG. 1. The server may have functions of the RBT-AS 103, the RBT-MRS 104, and the additional information server 105.

For example, when the calling terminal and the called terminal complete call media resource reservation through negotiation, the method may include the following steps.

Step 201: A server obtains video media content and additional information content.

The video media content includes a video ring back tone media content. Further, the video ring back tone media content may be determined and obtained by using a video ring back tone media identifier, or may be determined and obtained in another manner, for example, based on an existing video ring back tone media content obtaining process. This is not limited in this embodiment.

In addition, one implementation for obtaining the additional information content is: the server obtains at least one of the following identifiers, where the at least one identifier includes a calling party identifier, a called party identifier, or a video ring back tone media identifier; and determines, based on the at least one identifier and stored historical information, the additional information content.

For example, when the identifier is a calling party identifier, location information of the calling terminal may be determined based on the calling party identifier, then manufacturers in the vicinity of the calling terminal are determined based on the location information, and products of these manufacturers, for example, product-related information, are recommended to the calling terminal as the additional information content.

In addition, the calling party identifier, the called party identifier, or the video ring back tone media identifier may be obtained during the call media resource reservation before step 201, or the calling terminal or the called terminal sends the calling party identifier and the called party identifier to the server after the server requests the calling party identifier and the called party identifier.

Step 202: The server indicates the calling terminal to complete resource reservation for transmitting the video media content and the additional information content.

For example, the server may determine the transmission of the video media content and the additional information content by negotiating with the calling terminal. In an example, step 202 includes: the server constructs a first SDP description about the video media content and a second SDP description about the additional information content, and delivers the first SDP description and the second SDP description to the calling terminal in a SIP update message.

After receiving the SIP update message, the calling terminal parses the SIP update message and sends a response message to the server.

Then, the calling terminal completes the resource reservation for the video media content and the additional information content based on the SIP update message, and notifies the server to feed back an acknowledgement message, so that the calling terminal and the server acknowledge that the resource reservation for two types of content is completed.

Further, step 202 includes: the server sends an SDP message to the calling terminal, where the SDP message includes a first SDP description and a second SDP description that are negotiated with the calling terminal, information about a first port set is included in the first SDP description, and information about a second port set is included in the second SDP description; the server receives a response message fed back by the calling terminal in response to the SDP message; and the server receives a reservation acknowledgement notification sent by the calling terminal, where the reservation acknowledgement notification is used to indicate that the calling terminal completes the resource reservation for the video media content and the additional information content.

Optionally, the resource reservation for the video media content and the additional information content in this embodiment may also be collectively referred to as resource reservation for customized alerting tones (CATs).

The information about the first port set includes a first port number and a second port number, where a first port corresponding to the first port number and a second port corresponding to the second port number are used to receive the video media content, and the information about the second port set includes a third port number, where a third port corresponding to the third port number is used to receive the additional information content. Optionally, the first port number, the second port number, and the third port number are different from each other.

Step 203: The server transmits the video media content to the first port set of the calling terminal and transmits the additional information content to the second port set of the calling terminal.

Optionally, both the video media content and the additional information content may be sent in a real time protocol (RTP) stream. For example, in a certain period of time, the server sends a video media stream and an additional information stream to the calling terminal.

Optionally, the server sends the video media stream and the additional information stream at the same time, so that the calling terminal can receive two types of RTP streams at the same time.

According to the method provided in this embodiment, a function for storing and managing additional information content is added to a server end, proper additional information content is obtained by querying based on information about a calling party and a called party, and video media information, and then the additional information content and the video media content are sent to two port sets of the calling terminal. In this way, two types of content streams are transmitted to the calling terminal by using channels of the two port sets, and a function of providing an additional service in a process of playing a video ring back tone content is implemented, thereby a further requirement on user experience is met.

In addition, the server delivers the two types of content streams to the calling terminal at the same time, so that the calling terminal plays a video and displays additional information at the same time. This method is applicable to a scenario where there are massive video ring back tone contents, each of which has relatively short duration, thereby video playing performance and flexibility is improved.

Optionally, in the method provided in this embodiment, the method further includes the following.

After the calling terminal receives a video media content and an additional information content, plays a video corresponding to the video media content and displays additional information corresponding to the additional information content, and then reports information about an interaction operation on the calling terminal to the server, the server receives the information about the interaction operation from the calling terminal, where the information about the interaction operation includes duration during which the calling terminal displays the additional information in a secondary window, and/or an interaction operation performed on the additional information in the secondary window, for example, clicking to open or close the secondary window. The server stores and records the information reported by the calling terminal and various operation information, so as to be used for subsequent processing and delivery of additional information content.

Figure 3:
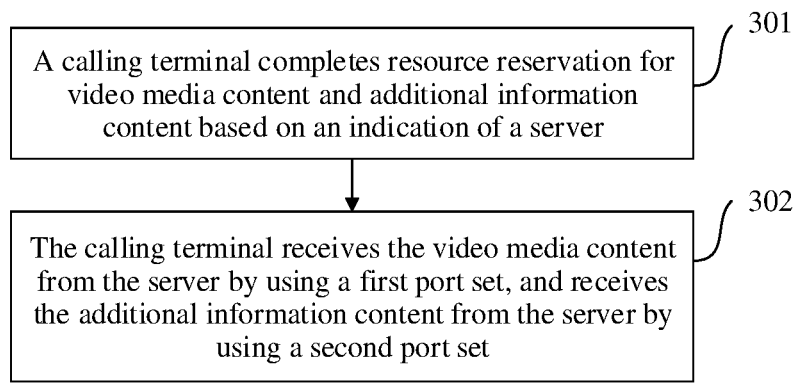
FIG. 3 is a flowchart of a content receiving method according to an embodiment.

In another aspect, on a terminal side, for example, for a calling terminal, this embodiment provides a content receiving method, which corresponds to the content sending method at a server end. As shown in FIG. 3, when the calling terminal and a called terminal complete call media resource reservation through negotiation, the method includes the following steps.

Step 301: The calling terminal completes resource reservation for video media content and additional information content based on an indication of a server.

The additional information content is generated by the server based on additional information. The additional information is determined by at least one identifier and stored historical information, and the at least one identifier includes a calling party identifier, a called party identifier, or a video ring back tone media identifier.

For example, step 301 includes: the calling terminal receives an SDP message sent by the server, where the SDP message includes a first SDP description and a second SDP description, information about a first port set is included in the first SDP description, and information about a second port set is included in the second SDP description; and the calling terminal parses the SDP message, and sends a response message to the server, then completes the resource reservation for the video media content and the additional information content based on the SDP message, generates a reservation acknowledgement notification, and sends the reservation acknowledgement notification to the server.

Step 302: The calling terminal receives the video media content from the server by using the first port set and receives the additional information content from the server by using the second port set.

In addition, the method further includes: the calling terminal calls a player to play a video corresponding to the video media content in a main window; and the calling terminal processes and analyzes the additional information content to obtain additional information, loads the additional information, and displays the additional information in a secondary window.

Optionally, the calling terminal plays the video corresponding to the video media content and displays the additional information corresponding to the additional information content at the same time.

Optionally, the video media content and the additional information content may be played or displayed at the same time in a same play window, for example, they are played or displayed in two interfaces in the main window.

Further, the method includes: the calling terminal obtains information about an interaction operation performed by the calling user on the additional information, where the information about an interaction operation includes duration during which the calling terminal displays the additional information in a secondary window, and/or an interaction operation performed on the additional information content in the secondary window. For example, when the additional information is a hyperlink to a product or a service, the interaction operation includes clicking the hyperlink to obtain further information. The calling terminal sends the information about an interaction operation to the server, so that the server stores and records the information about the interaction operation after receiving the information about the interaction operation, and uses the information about the interaction operation for subsequent processing and delivery of additional information content.

In this embodiment, the calling terminal negotiates with the server to determine the two port sets used to receive the video media content and the additional information content, receives the video media content by using the first port set, and receives the additional information content by using the second port set, thereby receiving two resource streams through two port sets, and playing a video ring back tone in a picture-in-picture mode.

In addition, after the calling terminal receives the two types of content streams, the calling terminal plays the video ring back tone in the main window and simultaneously displays the additional information in the secondary window, where a time difference between start of the playing operation and start of the displaying operation is relatively short(at a millisecond level). This may be applicable to a scenario where there are massive video ring back tone contents, each of which has relatively short duration.

Figure 4A:
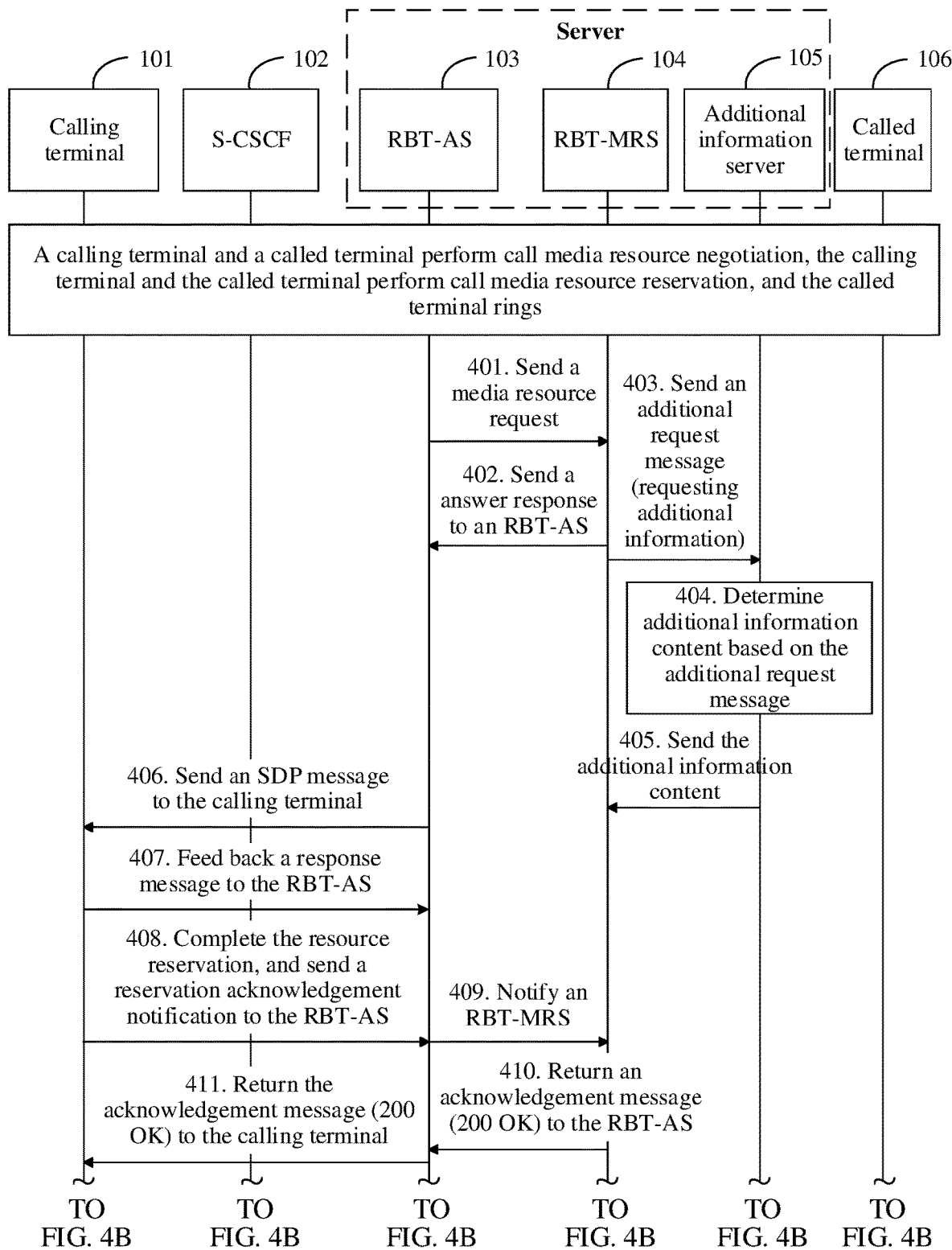
FIG. 4A and FIG. 4B are a signaling flowchart of a content transmission method according to an embodiment.
Figure 4B:
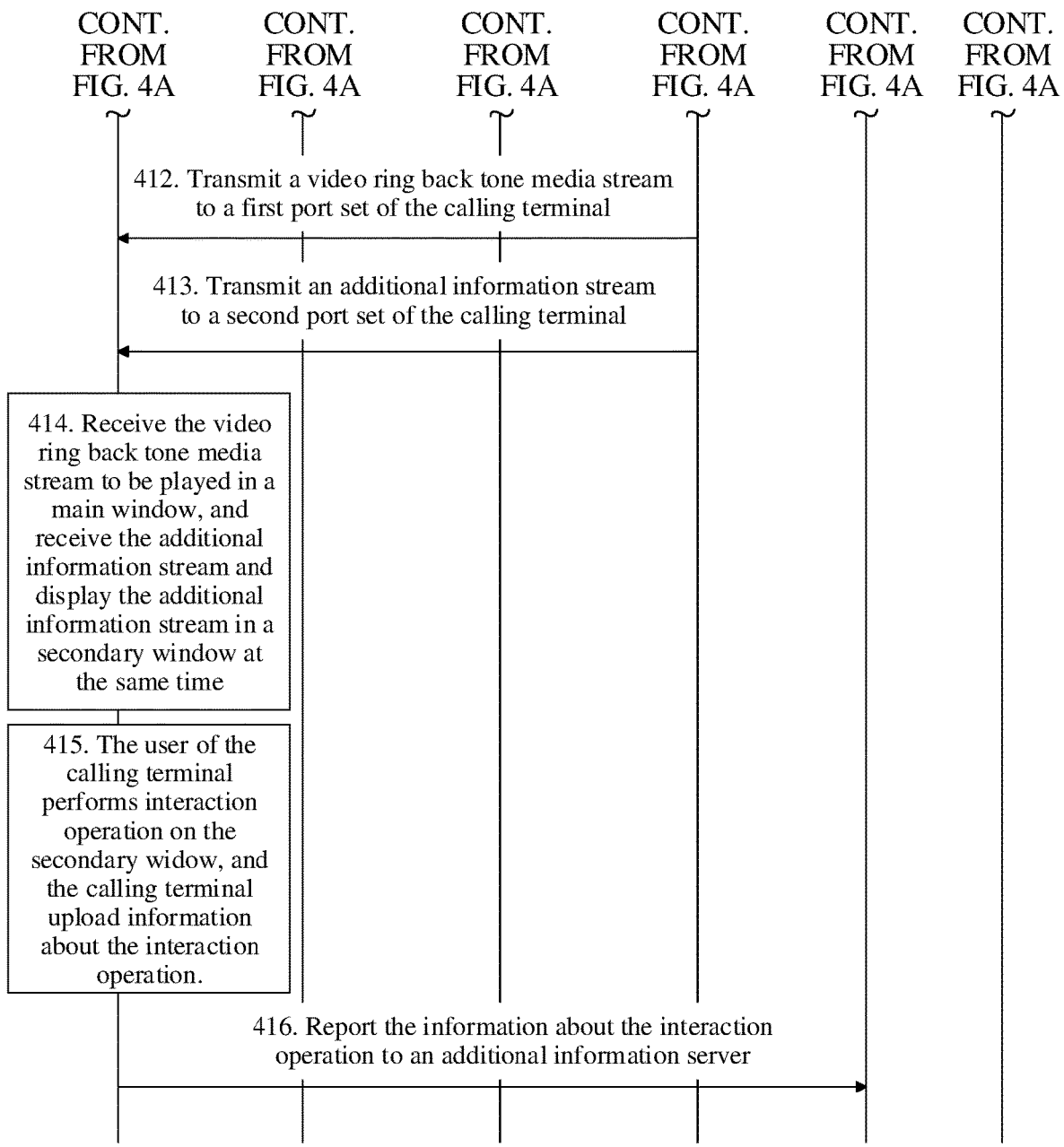

In an embodiment, FIG. 4A and FIG. 4B are a flowchart of a method according to an embodiment. The method may be applied to the system shown in FIG. 1.

The method may include the following steps.

When the calling terminal performs a calling operation to call the called terminal, the calling terminal and the called terminal perform call media resource negotiation. After the negotiation is completed, the calling terminal and the called terminal perform call media resource reservation, and the called terminal rings.

A call media resource is a transmission parameter for transmitting audio and/or a video during a call between the calling terminal and the called terminal. Optionally, the call media resource includes at least one of the following: an Internet Protocol (IP), a port number, a transmission protocol, a coding format, and bandwidth.

Step 401: An RBT-AS sends a media resource request to an RBT-MRS.

After the calling terminal and the called terminal complete the call media resource negotiation, the RBT-AS sends a media resource request to the RBT-MRS. The media resource request is used to request an SDP of a video media resource. The video media resource means a transmission parameter for transmitting a video ring back tone media content by the RBT-MRS to the calling terminal in a subsequent step. The SDP of the video media resource describes a video ring back tone media resource, for example, the specific transmission parameter.

The video media resource includes a video ring back tone media resource. Further, the video ring back tone media resource includes at least one of the following: an IP, a port number, a transmission protocol, a coding format, and bandwidth.

Optionally, the media resource request includes a called party identifier. For example, the called party identifier is used to uniquely indicate a called user. For example, if the called terminal is a mobile phone that uses a subscriber identification module (SIM) card, the called party identifier is a SIM card number.

Optionally, the media resource request may further include a calling party identifier, where the calling party identifier is used to determine a calling user.

Optionally, the media resource request may further include a video ring back tone media identifier, where the video ring back tone media identifier is used to uniquely indicate a video ring back tone content. Optionally, the video ring back tone media identifier is a unique number of a video ring back tone content subscribed to by the called user. Further, the video ring back tone media identifier may be obtained by the RBT-AS by querying based on the called party identifier. Alternatively, the video ring back tone media identifier may be obtained by the RBT-MRS by querying based on the called party identifier. This is not limited in this embodiment.

Step 402: The RBT-MRS sends an answer response to the RBT-AS.

For example, after receiving the media resource request from the RBT-AS, the RBT-MRS feeds back an answer response to the RBT-AS, where the answer response is used to notify the RBT-AS that the media resource request has been received.

Optionally, the answer response is "200 OK".

The media resource request includes at least one of the calling party identifier, the called party identifier, and the video ring back tone media identifier.

Step 403: The RBT-MRS sends an additional request message to an additional information server, where the additional request message is used to request additional information content.

The additional request message includes at least one of the calling party identifier, the called party identifier, and the ring back tone media identifier.

Optionally, when the media resource request received by the RBT-MRS from the RBT-AS includes only the called party identifier, the video ring back tone media identifier is obtained by querying based on the called party identifier. For example, in a possible implementation, the RBT-MRS stores a correspondence between the called party identifier and the video ring back tone media identifier. Thereby, the RBT-MRS determines the video ring back tone media identifier based on the called party identifier and the correspondence.

In addition, the RBT-MRS may also determine the video ring back tone media content based on the called party identifier, the video ring back tone media identifier, or the called party identifier and the video ring back tone media identifier.

Step 404: The additional information server receives the additional request message from the RBT-MRS and determines the additional information content based on the additional request message.

For example, the additional information server searches, based on at least one of the calling party identifier, the called party identifier, or the ring back tone media identifier in the additional request message, historical data stored in the additional information server and/or information transmitted from other servers, for the additional information content, which may meet a certain condition, and the additional information server may search, through interaction with the other servers, for example, a user information database or a ring back tone information database, for the additional information content, which may meet the certain condition.

The historical data may be additional information that is displayed by the calling terminal and that is recorded by the additional information server. An example of the certain condition of the additional information content may be information indicating that a video cannot be played again to the calling terminal if the video is already played on a specific day. The information transmitted by the other servers may be location information of the calling terminal. For example, when the calling terminal is at a specific location, corresponding additional information may be merchant information near the location.

When the additional request message includes the calling party identifier, a location of the calling terminal may be determined based on the calling party identifier, then manufacturers near the location of the calling terminal are determined based on the location of the calling terminal, and related information about the manufacturers is taken as the additional information, for example, services or product information of the manufacturers, to recommend to the calling terminal.

When the additional request message includes the called party identifier, preference of the called user and a historical preview record may be determined based on the called party identifier, and an additional information content associated with the preference of the called user and the historical preview record may be recommended to the called user.

When the additional request message includes the ring back tone media identifier, an attribute of a ring back tone media content is determined based on the ring back tone media identifier, for example, if it is determined that a ring back tone media content is of a child type, a video about a child toy, an animation, or the like is taken as additional information content to be recommended to the calling terminal or the called terminal.

In addition, similarly, the additional information server may further determine the additional information content based on a combination of two or three of the calling party identifier, the called party identifier, and the ring back tone media identifier, and display additional information corresponding to the additional information content to the calling terminal or the called terminal. For a specific determining process, refer to the aforementioned determining process of each identifier. This is not described in detail in this embodiment.

Optionally, the additional information content may include at least one of the following: a text, a picture, audio, a video, or the like.

Step 405: The additional information server sends the additional information content to the RBT-MRS.

Optionally, the additional information server may send the additional information content by including the additional information content in a SIP message.

Step 406: The RBT-AS sends an SDP message to the calling terminal.

For example, after obtaining the video ring back tone media content subscribed to by the called user, the RBT-AS constructs a first SDP description and a second SDP description, where information about the video ring back tone media resource negotiated with the calling terminal is included in the first SDP description, and information about the additional information resource is included in the second SDP description. Further, the first SDP description includes information about a first port set, and the information about the first port set includes a first port number and a second port number, where a first port corresponding to the first port number and a second port corresponding to the second port number are used to receive the video media content; the second SDP description includes information about a second port set, and the information about the second port set includes a third port number, where a third port corresponding to the third port number is used to receive the additional information content; and the first port number, the second port number, and the third port number are different from each other.

Further, content that is related to the video ring back tone media resource and that is included in the first SDP description is:

m=audio 8386 RTP/AVPF 97 96
b=AS:25.4
a=curr.qos local sendrecv
a=curr.qos local remote sendrecv
a=des.qos mandatory local sendrecv
a=des.qos mandatory remote sendrecv
a=rtpmap:97 AMR
a=fmtp:97 mode-set-0,2,5,7; maxframes
a=rtpmap:96 telephone-event
m=video 7398 RTP/AVPF 98
b=AS:75
a=curr.qos local sendonly
a=curr.qos local remote none
a=des.qos mandatory local sendonly
a=des.qos mandatory remote recvonly
a=rtpmap:97 H263
a=fmtp:98 profile-level-id=0

Optionally, content that is related to the additional information resource and that is included in the second SDP description is:

m=video 2265 RTP/AVPF 98
b=AS:75
a=curr.qos local sendonly
a=curr.qos local remote none
a=des.qos mandatory local sendonly
a=des.qos mandatory remote recvonly
a=rtpmap:98 H263
a=fmtp:98 profile-level-id=0

For example, in the first SDP description and the second SDP description, based on a requirement of an SDP session, the following rules may be met, as described in Table 1.

TABLE 1

| Session-level part | a = * | 0 or a plurality of session attribute lines |
| --- | --- | --- |
| | b = * | Bandwidth information |
| | v = * | Protocol version |
| Media-level part | m = * | Media name and transport address |
| | i = * | Media title |
| | b = * | Bandwidth information |
| | a = * | 0 or a plurality of session attribute lines |

As shown in Table 1, optional description items are represented by "*".

Usually, one session contains a plurality of media descriptions. Each media description starts with "m=" and ends with the next "m=" or ends with the end of a session description.

1. <media> indicates a media type. Currently, defined media types include "audio", "video", "application", "data", and "control". In addition, new media types may be developed due to emergence of new communication forms in the future, for example, due to emergence of telepresence.

2. <port> indicates a transport port for accepting a media stream, meaning of the transport port depends on a network type specified in a related "c=" line, and <transport> following the "c=" line indicates a transmission protocol. For example, for a port based on a user datagram protocol (UDP), a port number range is [1024, 65535]. To comply with RTP transmission, usually, a port number is an even number, which may be expressed as:

m=<media><port>/<number of ports><transport><fmt list>

In this embodiment, for the video ring back tone media resource in the first SDP description, a corresponding first port number for transmitting an audio resource is "8386". In addition, for the IP4, most media streams are transmitted through an RTP/UDP. RTP media streams of RTP audio and video resources have a protocol value RTP/AVP. The AVP corresponds to an audio profile and a video profile. Similarly, "m=video 7398" indicates that the first SDP description further includes resource that is used for transmitting a video content, which corresponds to port number "7398" used to receive the video content.

A first port corresponding to the first port number "8386" and a second port corresponding to the second port number "7398" may constitute a first port set, used to receive video ring back tone media contents.

Similarly, for the additional information resource in the second SDP description, it may be indicated that a third port number corresponding to a third port for transmitting another video content is "2265", which is used for transmitting an additional information stream, and the third port number is different from both the first port number and the second port number.

Optionally, the third port number may be used as a member of a second port set for transmitting the additional information stream, and the second port set may further include other ports, for example, a fourth port, for transmitting audio content.

In this method, with respect to provision of the additional information content, the RBT-AS negotiates to add an additional information stream (RTP stream) of a video type in a process of an original video ring back tone media resource, for transmitting the additional information content, and the additional information stream together with an original video ring back tone media stream is transmitted through different specified port sets, thereby transmitting two content streams through two port sets, implementing a function of displaying additional information when a video ring back tone media is played, and meeting a further requirement on user experience.

Optionally, the SDP message is a SIP update message. For example, the RBT-AS delivers the first SDP description and the second SDP description to the calling terminal through a session initiation protocol (SIP) update message.

Optionally, the RBT-AS forwards the SIP message to the calling terminal through an S-CSCF.

Step 407: The calling terminal receives an SDP message forwarded by the S-CSCF, parses the SDP message, and feeds back a response message to the RBT-AS.

For example, the SDP message includes the first SDP description and the second SDP description, where the first SDP description indicates that the calling terminal receives a first real time protocol (RTP) stream by using the first port set, and the second SDP description indicates that the calling terminal receives a second RTP stream by using the second port set. The first port set and the second port set are different. Further, the first RTP stream is a video ring back tone media stream, involving a first port used to receive audio contents and a second port used to receive video contents, and the second RTP stream is an additional information stream, involving a third port used to receive video contents.

Optionally, the calling terminal sends the response message to the S-CSCF, and then the S-CSCF forwards the response message to the RBT-AS.

Step 408: The calling terminal completes reservation for the video ring back tone media resource and the additional information resource based on the SDP message, generates a reservation acknowledgement notification, and sends the reservation acknowledgement notification to the RBT-AS.

Step 409: After receiving the reservation acknowledgement notification from the calling terminal, the RBT-AS sends the reservation acknowledgement notification to the RBT-MRS.

Step 410: After receiving the reservation acknowledgement notification from the RBT-AS, the RBT-MRS returns an acknowledgement message to the RBT-AS. Optionally, the acknowledgment message is "200 OK".

Step 411: The RBT-AS receives the acknowledgment message and forwards the acknowledgment message to the calling terminal.

Optionally, the RBT-AS forwards the acknowledgment message to the calling terminal through the S-CSCF.

Step 412: The RBT-MRS transmits the video ring back tone media stream to the first port set of the calling terminal.

Step 413: The RBT-MRS transmits the additional information stream to the second port set of the calling terminal.

The information of the first port set and the information of the second port set include different port numbers. The video ring back tone media stream corresponds to transmission of the video ring back tone media content, and the additional information stream corresponds to transmission of the additional information content. In addition, the two types of content may be sent to the calling terminal in a form of data packets.

Further, the RBT-MRS sends the video ring back tone media stream and the additional information stream to the calling terminal at the same time, so that the calling terminal receives the two types of RTP streams at the same time.

It may be noted that the video ring back tone media stream in this embodiment may also be video ring back tone media content. Similarly, the additional information stream may be additional information content. This is not limited in this embodiment.

Step 414: The calling terminal receives the video ring back tone media stream by using the first port set and receives the additional information stream by using the second port set. Further, the calling terminal invokes a player to play a video ring back tone corresponding to the video ring back tone media content in the main window, and processes the additional information stream through an additional information control module, and the additional information control module analyzes an information type of the additional information stream, loads additional information, and displays the additional information in a secondary window.

The first port set and the second port set may respectively include ports at a level of calling application in the calling terminal.

Optionally, if the calling terminal receives the video ring back tone media stream and the additional information stream at the same time, the calling terminal plays a video ring back tone in the main window and simultaneously displays additional information in the secondary window, where a time difference between start of the playing operation and start of the displaying operation is relatively short (at a millisecond level), thereby being applicable to a scenario where a video ring back tone content has a relatively short duration.

Step 415: The user of the calling terminal performs an interaction operation on the additional information displayed in the secondary window, for example, clicks a hyperlink of a product in the secondary window to obtain a response, or closes the secondary window, and the calling terminal uploads information about the interaction operation.

Step 416: The calling terminal reports the information about the interaction operation to the additional information server.

For example, the information about an interaction operation includes information such as duration during which the calling terminal presents the additional information in the secondary window, or interaction (clicking or closing) operation. Further, the reported information about an interaction operation may be reported by invoking an interface (for example, usually a web RESTful API) provided by the server, and the reported information about an interaction operation may be recorded on the additional information server or other similar servers, so that the additional information server records the information about the interaction operation on the calling terminal, where a result of the recording can be used for subsequent delivery and use of additional information content.

Optionally, the calling terminal may further report information about the video ring back tone and interaction on the video ring back tone presented in the main window by the user to the RBT-AS or the RBT-MRS.

According to the method provided in this embodiment, an additional information server is added in addition to an original ring back tone media system to store and manage additional information content, to provide proper additional information content for a calling terminal based on a request of the RBT-MRS. In this way, the server provides both a video ring back tone service and an additional information service for the calling terminal, and the method meets a further requirement on user experience.

In addition, the additional information server that provides the additional information content searches for proper additional information content for the calling user and the called user based on the ring back tone media identifier, or the calling party identifier, or the called party identifier in the request message, which is a process of dynamic allocation. For example, different additional information content may be dynamically determined for different ring back tone media content, different calling party identifier or different called party identifier, so that flexibility of providing an additional information service is further improved, thereby quality of service is improved.

Figure 5:
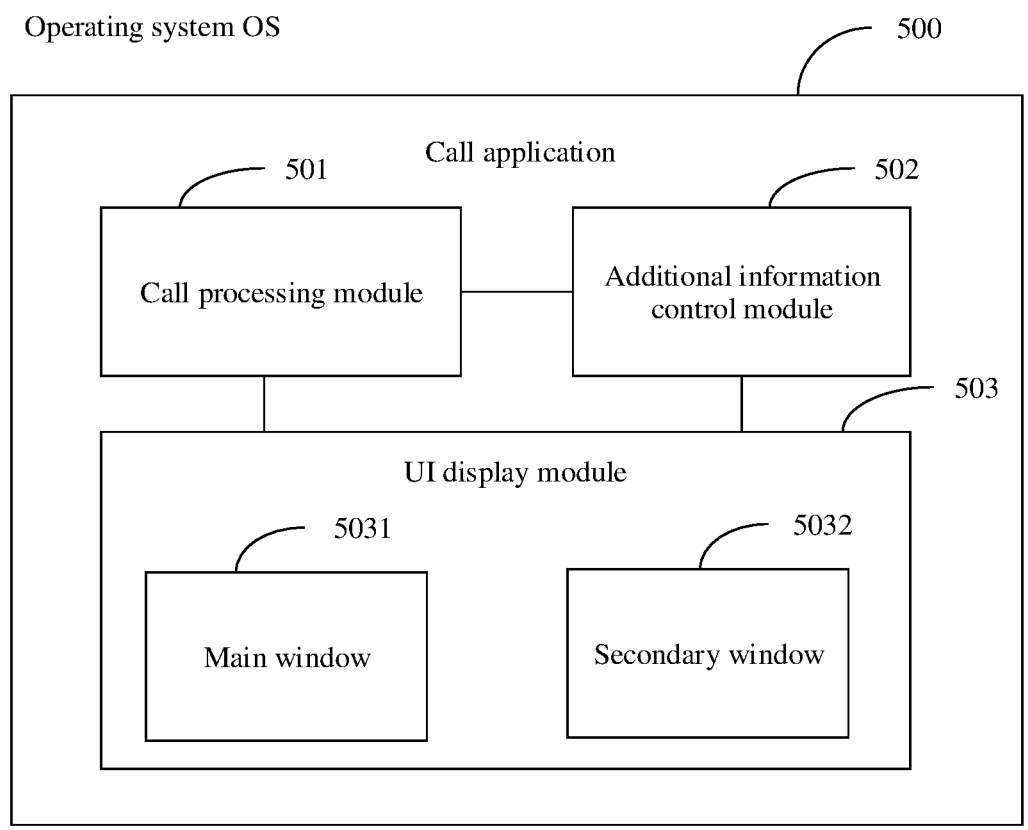
FIG. 5 is a schematic structural diagram of a calling terminal according to an embodiment.

Further, as shown in FIG. 5, a calling terminal includes an operating system (OS) and a call application 500 running in the OS. The call application 500 includes a call processing module 501, an additional information control module 502, and a user interface (UI) display module 503. The call processing module 501 is configured to implement a call function of the calling terminal, for example, perform dialing to call a called terminal, and perform message transmission with various servers.

The additional information control module 502 is configured to: parse an SDP message, and display additional information in a secondary window in a proper form based on a type of an RTP stream, for example, adjust a length and a width of a secondary window based on a length-width ratio of a video, a length and a width of a picture, and a quantity of texts in the additional information content.

The UI display module 503 is configured to present and play a video ring back tone and display additional information. For example, the UI display module 503 includes a main window 5031 and a secondary window 5032, where the main window 5031 is configured to play the video ring back tone, and the secondary window 5032 is configured to display the additional information.

The additional information includes but is not limited to resources such as a text, a picture, audio, and a video.

Figure 6:
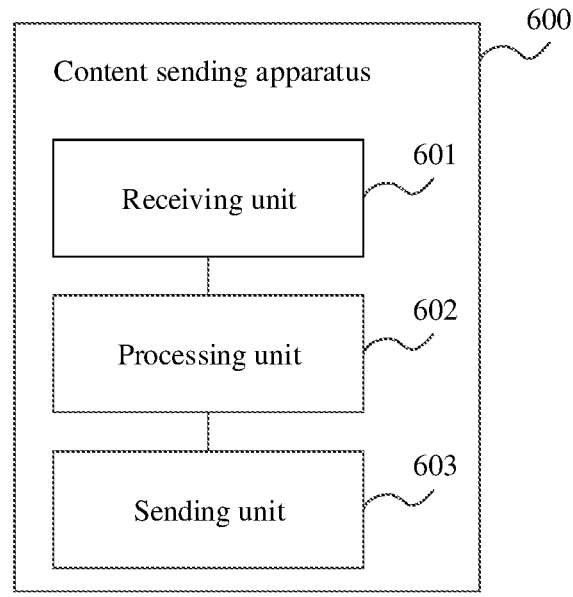
FIG. 6 is a schematic structural diagram of a content sending apparatus according to an embodiment.

FIG. 6 is a schematic structural diagram of a content sending apparatus according to an embodiment. The apparatus 600 includes a receiving unit 601, a processing unit 602, and a sending unit 603, and may further include other function modules or units, for example, a storage unit. The apparatus may be a server and is configured to execute the content sending method in the foregoing embodiment.

For example, the receiving unit 601 is configured to obtain video media content and additional information content; the processing unit 602 is configured to indicate a calling terminal to complete resource reservation for transmitting the video media content and the additional information content; and the sending unit 603 is configured to: transmit the video media content to a first port set of the calling terminal, and transmit the additional information content to a second port set of the calling terminal.

Optionally, in an implementation of this embodiment, the receiving unit 601 is configured to: obtain at least one identifier, where the at least one identifier includes a calling party identifier, a called party identifier, or a video ring back tone media identifier, and determine, based on the at least one identifier and stored historical information, the additional information content, which may meet a certain condition.

Optionally, in still another implementation of this embodiment, the processing unit 602 is configured to send an SDP message to the calling terminal through the sending unit 603, where the SDP message includes a first SDP description about the video media content and a second SDP description about the additional information content that are negotiated with the calling terminal, information about the first port set is included in the first SDP description, and information about the second port set is included in the second SDP description. The receiving unit 601 is further configured to receive a reservation acknowledgement notification sent by the calling terminal, where the reservation acknowledgement notification is used to indicate that the calling terminal completes the resource reservation for the video media content and the additional information content.

The information about the first port set includes a first port number and a second port number, where a first port corresponding to the first port number and a second port corresponding to the second port number are used to receive the video media content, and the information about the second port set includes a third port number, where a third port corresponding to the third port number is used to receive the additional information content.

Optionally, in still another implementation of this embodiment, the receiving unit 601 is further configured to receive information about an interaction operation from the calling terminal. The information about an interaction operation includes duration during which the calling terminal displays the additional information, or an interaction operation performed on the additional information.

According to the apparatus provided in this embodiment, a function for storing and managing additional information content is added, proper additional information content is obtained by querying based on information about a calling party and a called party, and video media information, and then the additional information content and the video media content are sent to two port sets of the calling terminal. In this way, two types of content streams are transmitted to the calling terminal by using channels of the two port sets, and a function of providing an additional service in a process of playing a video ring back tone is implemented, thereby a further requirement on user experience is met.

In addition, the server delivers the two types of content streams to the calling terminal at the same time, so that the calling terminal plays the video and displays the additional information at the same time. This method is applicable to a scenario where there are massive video ring back tone contents, each of which has relatively short duration, thereby improving video playing performance and flexibility.

Figure 7:
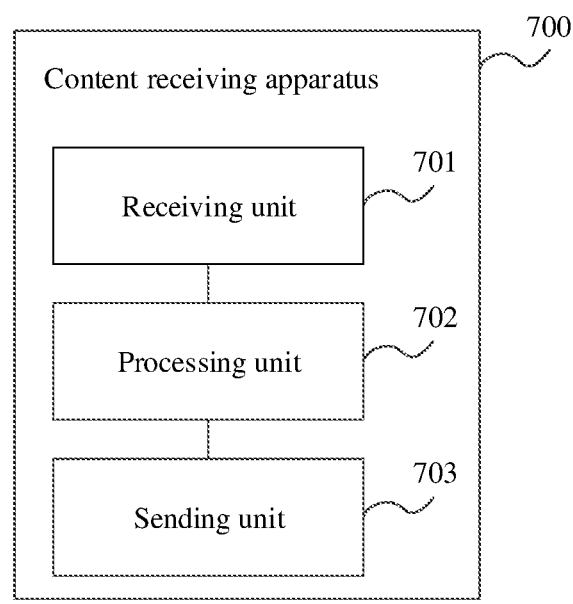
FIG. 7 is a schematic structural diagram of a content receiving apparatus according to an embodiment.

FIG. 7 is a schematic structural diagram of a content receiving apparatus according to an embodiment. The apparatus 700 includes a receiving unit 701, a processing unit 702, and a sending unit 703, and may further include other function modules or units, for example, a storage unit. This is not limited in this embodiment.

The apparatus 700 may be applied to a calling terminal and is configured to execute the content receiving method described in the foregoing embodiment.

For example, the processing unit 702 is configured to complete resource reservation for video media content and additional information content based on an indication of a server. The receiving unit 701 is configured to receive the video media content from the server by using a first port set and receive the additional information content from the server by using a second port set.

The additional information content is generated by the server based on additional information. The additional information is determined by at least one identifier and stored historical information, and the at least one identifier includes a calling party identifier, a called party identifier, or a video ring back tone media identifier.

Optionally, in an implementation of this embodiment, the processing unit 702 is configured to: receive, by using the receiving unit, a session description protocol (SDP) message sent by the server, complete the resource reservation for the video media content and the additional information content based on the SDP message, and generate a reservation acknowledgement notification. The SDP message includes a first SDP description about the video media content and a second SDP description about the additional information content that are negotiated with the calling terminal, information about the first port set is included in the first SDP description, and information about the second port set is included in the second SDP description. The sending unit 703 is configured to send the reservation acknowledgment notification to the server.

The information about the first port set includes a first port number and a second port number, where a first port corresponding to the first port number and a second port corresponding to the second port number are used to receive the video media content, and the information about the second port set includes a third port number, where a third port corresponding to the third port number is used to receive the additional information content.

Optionally, in another implementation of this embodiment, the processing unit 702 is further configured to: play a video corresponding to the video media content, and display additional information corresponding to the additional information content.

Further, the processing unit 702 is configured to: play the video corresponding to the video media content and display additional information corresponding to the additional information content at the same time.

Optionally, in still another implementation of this embodiment, the receiving unit 701 is further configured to obtain information about an interaction operation performed by a calling user on the additional information, where the information about an interaction operation includes duration during which the calling terminal displays the additional information, or an interaction operation performed on the additional information. The sending unit 703 is further configured to send the information about an interaction operation to the server.

According to the apparatus provided in this embodiment, after the apparatus receives video ring back tone media content and additional information content from the server at the same time, the apparatus plays video ring back tone corresponding to the video ring back tone content in the main window and simultaneously displays additional information corresponding to the additional information content in the secondary window, where a time difference between start of the playing operation and start of the displaying operation is relatively short (at a millisecond level). This may be applicable to a scenario where there are massive video ring back tone contents, each of which has relatively short duration. In this way, two types of content streams are received and are played or displayed at the same time.

Figure 8:
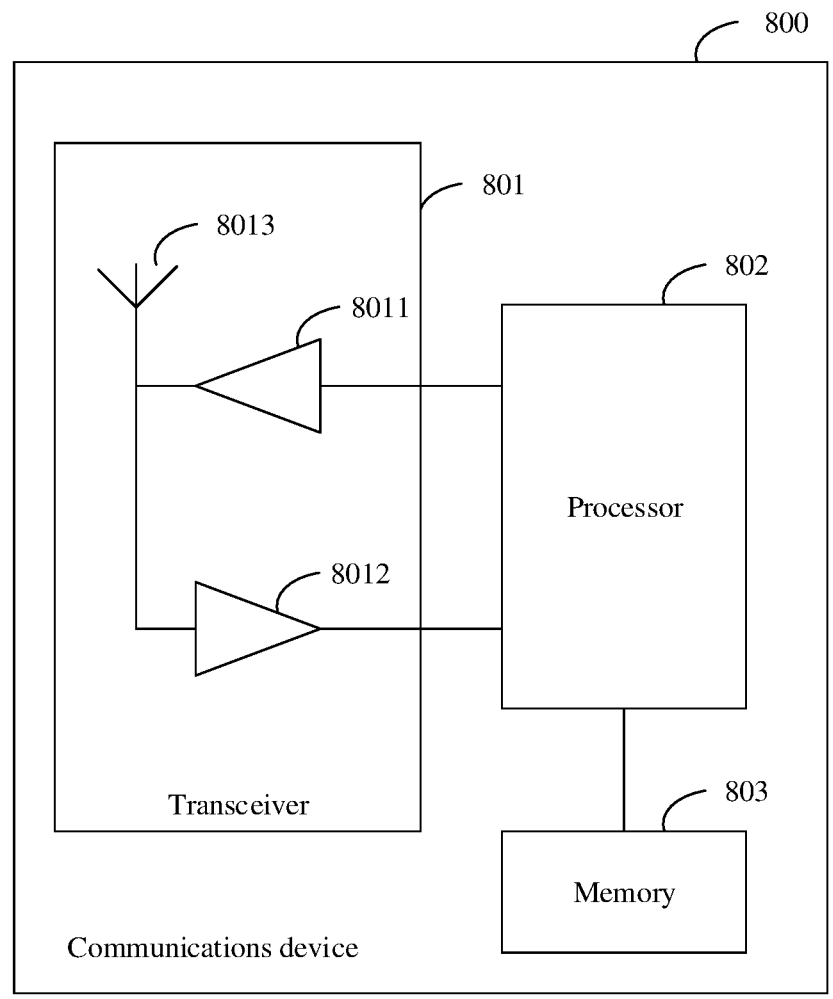
FIG. 8 is a schematic structural diagram of a communications device according to an embodiment.

In a hardware implementation, as shown in FIG. 8, the embodiments further provide a communications device. The communications device 800 may be the server in the foregoing method embodiments, or may be a calling terminal, a called terminal, or the like.

For example, the communications device 800 includes a transceiver 801, a processor 802, and a memory 803. The communications device may further include more or fewer components, or combine some components, or have different component arrangements. This is not limited in the embodiments.

The transceiver 801 is configured to: receive and send content information or data, and perform data transmission with another device in a network. Further, the transceiver 801 may include components such as a receiver 8011, a transmitter 8012, and an antenna 8013, or may further include a transceiver module. Further, the transceiver module may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or cellular communications system communication, such as wideband code division multiple access (WCDMA) and/or high speed downlink packet access (HSDPA). The transceiver module is configured to control communication between all the components in the communication device and may support direct memory access.

The processor 802 is a control center of the communications device, is connected to each part of the entire device through various interfaces and lines, and performs various functions of the communications device and/or processes data by running or executing a software program and/or a unit stored in the memory 803, and invoking data stored in the memory 803.

Further, the processor 802 may include an integrated circuit (IC), for example, may include a single packaged IC, or may include a plurality of connected packaged ICs with a same function or different functions. For example, the processor may include only a central processing unit (CPU), or may be a combination of a GPU, a digital signal processor (DSP), and a control chip (such as a baseband chip) in the transceiver.

The memory 803 may include a volatile memory, for example, a random access memory (RAM), or may include a non-volatile memory, for example, a flash memory, a hard disk (HDD), or a solid-state drive (SSD). The memory may further include a combination of the foregoing types of memories. The memory may store a program or code, and the processor 802 may implement a function of the communications device by executing the program or the code.

In this embodiment, when the communications device is used as a server, functions to be implemented by the transceiver 801 may be implemented by the receiving unit 601 and the sending unit 603 in the apparatus embodiment shown in FIG. 6, or may be implemented by the transceiver 801 controlled by the processor 802. A function to be implemented by the processing unit 602 may be implemented by the processor 802.

The server includes a server or a server cluster of the RBT-AS, the RBT-MRS, and the additional information server in the foregoing embodiments.

Optionally, when the communications device is used as a calling terminal, functions to be implemented by the transceiver 801 may be implemented by the receiving unit 701 and the sending unit 702 in the apparatus embodiment shown in FIG. 7, or may be implemented by the transceiver 801 controlled by the processor 802. A function to be implemented by the processing unit 702 may be implemented by the processor 802.

In addition, the communications device 800 may alternatively be the calling terminal shown in FIG. 5. Functions to be implemented by the call processing module 501 and the additional information control module 502 may be implemented by the processor 802, and a function of the UI display module 503 may be implemented by a display module of the terminal.

In addition, an embodiment further provides a multimedia play system. The system includes the server and the calling terminal shown in FIG. 8 in the foregoing embodiments, so as to implement the content sending method and the content receiving method in the foregoing method embodiments.

In addition, the embodiments further provide a computer storage medium, where the computer storage medium may store a program, and when the program is executed, some or all of the steps in the embodiments of the content sending method and the content receiving method provided in the embodiments may be performed. The foregoing storage medium may include: a magnetic disk, an optical disc, a ROM, or a RAM.

All or some of the foregoing embodiments may be implemented by using software, hardware, firmware, or any combination thereof. When software is used to implement the embodiments, the embodiments may be implemented in a form of a computer program product.

The computer program product includes one or more computer instructions. When the computer instructions are loaded and executed on a computer, the procedure or functions according to the embodiments are all or partially generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a network node, computer, server, or data center to another network node, computer, or server in a wired or wireless manner.

For same or similar parts in the embodiments, refer to each other. Especially, the apparatus embodiments are basically similar to the method embodiments, and therefore are described briefly. For related parts, refer to descriptions in the method embodiments.

In addition, in the descriptions of the embodiments, "a plurality of" means two or more than two unless otherwise specified. In addition, to clearly describe the solutions in the embodiments, terms such as "first" and "second" are used in the embodiments to distinguish between same items or similar items that have basically the same functions or purposes. A person of ordinary skill in the art may understand that the terms such as "first" and "second" do not limit a quantity or an execution sequence, and the terms such as "first" and "second" do not mean being definitely different either.

The foregoing implementations of the embodiments are non-limiting.

What is claimed is:

1. A method, applied to a server, the method comprising:
    obtaining, by the server, video media content and additional information content;
    indicating, by the server, a calling terminal to complete resource reservation for transmitting the video media content and the additional information content;
    transmitting, by the server, the video media content to a first port set of the calling terminal;
    transmitting, by the server, the additional information content to a second port set of the calling terminal; and
    receiving, by the server, information about an interaction operation from the calling terminal, wherein the information about the interaction operation comprises a duration during which the calling terminal displays additional information corresponding to the additional information content.

2. The method according to claim 1, wherein obtaining, by the server, the additional information content further comprises:
    obtaining, by the server, at least one identifier, wherein the at least one identifier comprises a calling party identifier, a called party identifier, or a video ring back tone media identifier; and
    determining, by the server, based on the at least one identifier and stored historical information, the additional information content.

3. The method according to claim 1, wherein indicating, by the server, of the calling terminal to complete the resource reservation for transmitting the video media content and the additional information content further comprises:
    sending, by the server, a session description protocol (SDP) message to the calling terminal, wherein the SDP message comprises a first SDP description about the video media content and a second SDP description about the additional information content that are negotiated with the calling terminal, information about the first port set is in the first SDP description, and information about the second port set is in the second SDP description; and
    receiving, by the server, a reservation acknowledgement notification sent by the calling terminal, wherein the reservation acknowledgement notification is used to indicate that the calling terminal completes the resource reservation for the video media content and the additional information content.

4. The method according to claim 3, wherein the information about the first port set comprises a first port number and a second port number, a first port corresponding to the first port number and a second port corresponding to the second port number are used to receive the video media content, the information about the second port set comprises a third port number, and a third port corresponding to the third port number is used to receive the additional information content.

5. A method, wherein the method is applied to a calling terminal, and the method comprises:
    completing, by the calling terminal, resource reservation for video media content and additional information content based on an indication of a server;
    receiving, by the calling terminal, the video media content from the server by using a first port set;
    receiving, by the calling terminal, the additional information content from the server by using a second port set;
    obtaining, by the calling terminal, information about an interaction operation performed by a calling user on the additional information, wherein the information about the interaction operation comprises a duration during which the calling terminal displays the additional information; and
    sending, by the calling terminal, the information about the interaction operation to the server.

6. The method according to claim 5, wherein the additional information content is generated by the server based on additional information, the additional information is determined by at least one identifier and stored historical information, and the at least one identifier comprises a calling party identifier, a called party identifier, or a video ring back tone media identifier.

7. The method according to claim 5, wherein completing, by the calling terminal, of the resource reservation for the video media content and the additional information content based on the indication of the server further comprises:
    receiving, by the calling terminal, a session description protocol (SDP) message sent by the server, wherein the SDP message comprises a first SDP description about the video media content and a second SDP description about the additional information content that are negotiated with the calling terminal, information about the first port set is in the first SDP description, and information about the second port set is in the second SDP description;
    completing, by the calling terminal, the resource reservation for the video media content and the additional information content based on the SDP message, and generating a reservation acknowledgement notification; and
    sending, by the calling terminal, the reservation acknowledgement notification to the server.

8. The method according to claim 7, wherein the information about the first port set comprises a first port number and a second port number, a first port corresponding to the first port number and a second port corresponding to the second port number are used to receive the video media content, the information about the second port set comprises a third port number, and a third port corresponding to the third port number is used to receive the additional information content.

9. The method according to claim 5, further comprising:
playing, by the calling terminal, a video corresponding to the video media content, and
displaying, by the calling terminal, additional information corresponding to the additional information content.

10. A server, comprising at least one processor and a memory, wherein the memory is configured to store a program, and the program, when executed by the at least one processor, causes the server to:
obtain video media content and additional information content;
indicate a calling terminal to complete resource reservation for transmitting the video media content and the additional information content;
transmit the video media content to a first port set of the calling terminal;
transmit the additional information content to a second port set of the calling terminal; and
receive information about an interaction operation from the calling terminal, wherein the information about the interaction operation comprises a duration during which the calling terminal displays additional information corresponding to the additional information content.

11. The server according to claim 10, wherein the program, when executed by the at least one processor, further causes the server to:
obtain at least one identifier, wherein the at least one identifier comprises a calling party identifier, a called party identifier, or a video ring back tone media identifier; and
determine, based on the at least one identifier and stored historical information, the additional information content.

12. The server according to claim 10, wherein the program, when executed by the at least one processor, further causes the server to:
send a session description protocol (SDP) message to the calling terminal, wherein the SDP message comprises a first SDP description about the video media content and a second SDP description about the additional information content that are negotiated with the calling terminal, information about the first port set is in the first SDP description, and information about the second port set is in the second SDP description; and
receive a reservation acknowledgement notification sent by the calling terminal, wherein the reservation acknowledgement notification is used to indicate that the calling terminal completes the resource reservation for the video media content and the additional information content.

13. The server according to claim 12, wherein the information about the first port set comprises a first port number and a second port number, wherein a first port corresponding to the first port number and a second port corresponding to the second port number are used to receive the video media content, and the information about the second port set comprises a third port number, wherein a third port corresponding to the third port number is used to receive the additional information content.

14. The method according to claim 5, wherein the calling terminal plays the video corresponding to the video media content and displays the additional information corresponding to the additional information content at the same time in two interfaces in a main window.

15. The method according to claim 5, wherein the calling terminal plays, in a main window, the video corresponding to the video media content and displays, in a secondary window, the additional information corresponding to the additional information content at the same time.

* * * * *